US009526267B2

(12) United States Patent
Anderson et al.

(10) Patent No.: US 9,526,267 B2
(45) Date of Patent: Dec. 27, 2016

(54) NUTRIENT-DENSE MEAT STRUCTURED PROTEIN PRODUCTS

(71) Applicant: Savage River, Inc., El Segundo, CA (US)

(72) Inventors: David Anderson, Agoura Hills, CA (US); Justin Fuller, Columbia, MO (US); Timothy Geistlinger, Oakland, CA (US)

(73) Assignee: Savage River, Inc., El Segundo, CA (US)

( * ) Notice: Subject to any disclaimer, the term of this patent is extended or adjusted under 35 U.S.C. 154(b) by 0 days.

(21) Appl. No.: 14/687,830

(22) Filed: Apr. 15, 2015

(65) Prior Publication Data

US 2015/0296835 A1    Oct. 22, 2015

Related U.S. Application Data

(60) Provisional application No. 61/981,122, filed on Apr. 17, 2014.

(51) Int. Cl.
*A23L 1/212* (2006.01)
*A23J 3/22* (2006.01)
*A23J 3/14* (2006.01)

(52) U.S. Cl.
CPC ........ *A23J 3/227* (2013.01); *A23J 3/14* (2013.01); *A23V 2002/00* (2013.01)

(58) Field of Classification Search
CPC .................................... A23J 3/14; A23J 3/227
USPC ...... 426/573, 574, 615, 656, 72, 73, 74, 601
See application file for complete search history.

(56) References Cited

U.S. PATENT DOCUMENTS

| | | | |
|---|---|---|---|
| 3,912,824 A | 10/1975 | Spiel | |
| 3,940,495 A | 2/1976 | Flier | |
| 3,968,269 A | 7/1976 | Payne et al. | |
| 4,001,459 A | 1/1977 | Kim et al. | |
| 4,125,630 A | 11/1978 | Orthoefer | |
| 4,303,682 A | 12/1981 | Guitteny et al. | |
| 4,938,976 A | 7/1990 | Shemer | |
| 5,667,825 A | 9/1997 | Humbert et al. | |
| 5,922,392 A | 7/1999 | Kelly et al. | |
| 6,635,301 B1 | 10/2003 | Howsam | |
| 6,777,016 B2 | 8/2004 | Thresher | |
| 7,250,186 B2 | 7/2007 | Pfaller et al. | |
| 7,338,679 B2 | 3/2008 | Uchida et al. | |
| 7,713,559 B2 | 5/2010 | Zeller et al. | |
| 7,923,044 B2 | 4/2011 | Bias | |
| 7,998,518 B2 | 8/2011 | Kweldam | |
| 8,062,686 B2 | 11/2011 | Gahler et al. | |
| 8,257,775 B2 | 9/2012 | Axelrod et al. | |
| 8,293,297 B2 | 10/2012 | Orcutt et al. | |
| 8,293,316 B2 | 10/2012 | Castillo et al. | |
| 8,529,976 B2 | 9/2013 | McMindes et al. | |
| 8,691,315 B2 | 4/2014 | Clark et al. | |
| 2005/0260325 A1 | 11/2005 | Sihvola | |
| 2006/0141125 A1 | 6/2006 | Gifford | |
| 2007/0269571 A1 | 11/2007 | Akita et al. | |
| 2008/0075808 A1 | 3/2008 | Altemueller | |
| 2008/0095897 A1 | 4/2008 | Abril et al. | |
| 2008/0102165 A1 | 5/2008 | Ning et al. | |
| 2008/0248167 A1 | 10/2008 | McMindes et al. | |
| 2008/0254168 A1 | 10/2008 | Mueller et al. | |
| 2008/0268112 A1 | 10/2008 | Rolan et al. | |
| 2009/0123629 A1 | 5/2009 | Chang et al. | |
| 2009/0155447 A1 | 6/2009 | Moore et al. | |
| 2009/0208633 A1 | 8/2009 | Kyed et al. | |
| 2009/0291188 A1 | 11/2009 | Milne et al. | |
| 2010/0166940 A1 | 7/2010 | McMindes et al. | |
| 2010/0215832 A1 | 8/2010 | Redman | |
| 2010/0221397 A1 | 9/2010 | Iversen et al. | |
| 2010/0233347 A1 | 9/2010 | Uhrhan et al. | |
| 2012/0045560 A1 | 2/2012 | Axelrod | |
| 2012/0093994 A1 | 4/2012 | Hsieh et al. | |
| 2012/0207904 A1 | 8/2012 | Twombly et al. | |
| 2013/0209614 A1 | 8/2013 | Doare-Broux et al. | |
| 2013/0243904 A1 | 9/2013 | Cordle et al. | |
| 2014/0127363 A1 | 5/2014 | Giezen et al. | |
| 2014/0193547 A1 | 7/2014 | Brown et al. | |
| 2014/0220217 A1 | 8/2014 | Brown et al. | |

FOREIGN PATENT DOCUMENTS

| | | |
|---|---|---|
| WO | 2012/091571 A2 | 7/2012 |
| WO | 2014/110532 A2 | 7/2014 |
| WO | 2014/110539 A1 | 7/2014 |
| WO | 2014/110540 A1 | 7/2014 |
| WO | 2015/153666 A1 | 10/2015 |

OTHER PUBLICATIONS

Onwulata et al., "Properties of Whey Protein Isolates Extruded under Acidic and Alkaline Conditions," Journal of Dairy Science (2006) vol. 89, No. 1, pp. 71-81, 2006.
Lin, S. et al., "Extrusion Process Parameters, Sensory Characteristics, and Structural Properties of a High Moisture Soy Protein Meat Analog," Journal of Food Science vol. 67, Nr. 3, pp. 1066-1072, 2002.
Akdogen, Hulya, "High Moisture Food Extrusion," International Journal of Food Science and Technology 1999, 34, pp. 195-207, 1999.

*Primary Examiner* — Helen F. Heggestad
(74) *Attorney, Agent, or Firm* — David R. Conklin; Kirton McConkie

(57) ABSTRACT

Provided are nutrient-dense meat structured protein products providing complete sources of protein and essential nutrients. Also provided are methods and processes for producing such nutrient-dense meat structured protein products. Also provided are nutrient-dense condiments that can be packaged with meat structured protein products or nutrient-dense meat structured protein products.

26 Claims, No Drawings

NUTRIENT-DENSE MEAT STRUCTURED PROTEIN PRODUCTS

CROSS REFERENCE TO RELATED APPLICATIONS

This application claims priority from Provisional Application Ser. No. 61/981,122 filed on Apr. 17, 2014, which is hereby incorporated by reference in its entirety.

FIELD OF THE INVENTION

Provided are food products that may serve as replacements or substitutes for cooked animal meat and that comprise essential nutrients. Also provided are processes for the production of such food products.

BACKGROUND OF THE INVENTION

A large number of individuals around the world follow vegetarian or vegan diets. Their dietary choices are motivated either by necessity (e.g., scarcity of resources, allergies or intolerances to animal-derived food products) or by ethical or health concerns (e.g., desire to take better care of the earth's resources and environment, concern about how farm animals are treated, fear of antibiotics and growth stimulants in animal products and of animal-born diseases, and understanding of the health advantages associated with plant-based diets).

Vegetarian diets are associated with the many health benefits that a higher dietary content of fiber, folic acid, vitamins C and E, potassium, magnesium, many phytochemicals, as well as a lower dietary content of sugar, cholesterol, and hydrogenated or trans fats bring. Vegan diets contain even less saturated fat and cholesterol and even more dietary fiber.

However, vegetarian and vegan diets are also associated with an increased risk of certain nutritional deficiencies. As a result, vegetarians and vegans are advised to supplement their plant-based diets with nutrients that are not readily available from plant sources but necessary to meet physiological requirements, such as vitamins B-12 and D, calcium, zinc, iron, and long-chain n-3 (omega-3) fatty acids. They are also advised to ensure adequate protein intake.

The need for protein and other essential nutrients not readily obtained from plant sources is generally satisfied by vegetarian and vegans by consuming nutrient fortified protein-rich non-animal derived foods, snack bars, drink mixes, and concentrated supplements in tablet or liquid form. Fortified foods and supplements are sold widely, and are also used by many athletes and non-vegetarians/-vegans who are concerned with eating a well-balanced, nutrient-dense diet to enhance their physical and mental performance. The available drink mixes and snack bars are, however, generally only eaten between and in addition to regular meals. No center-plate food item is presently available that can provide the supplemental nutrition sought by vegetarians and vegans.

Therefore, there exists a need for nutrient-dense center-plate food items that provide vegetarians/vegans and non-vegetarians/-vegans both a regular non-animal protein source and the supplemental nutrients a plant-based diet cannot adequately provide. The present invention provides such nutrient-dense meat structured protein products, as well as cost-effective methods and processes for their production.

SUMMARY OF THE INVENTION

One aspect of the present invention provides nutrient-dense meat structured protein products that comprise at least 30% by weight of water, at least 5% by weight of non-animal protein material, substantially aligned protein fibers, and essential nutrients such as iron, omega-3 fatty acids, calcium, antioxidants, and vitamin B-12.

Another aspect of the present invention provides processes for producing the nutrient-dense meat structured protein products. In some embodiments, the processes comprise the steps of combining a non-animal protein material and water with at least one heat stable nutrient to form a dough; shearing and heating the dough so as to denature the proteins in the protein material and to produce protein fibers that are substantially aligned in a fibrous structure; and setting the dough to fix the fibrous structure previously obtained. In other embodiments, the processes comprise the steps of combining a non-animal protein material and water to form a dough; shearing and heating the dough so as to denature the proteins in the protein material and to produce protein fibers that are substantially aligned in a fibrous structure; setting the dough to fix the fibrous structure previously obtained, thereby obtaining a protein fibrous product; and subjecting the protein fibrous product to at least one post-processing step that involves addition of an essential nutrient to the meat structured protein products.

Yet another aspect of the present invention provides nutrient-dense condiments that comprise essential nutrients, in particular non-heat stable nutrients such as omega-3 fatty acids, antioxidants, and vitamin B-12.

Yet another aspect of the present invention provides packaged food products that comprise meat structured protein products or nutrient-dense meat structured protein products in combination with condiments or nutrient-dense condiments.

DETAILED DESCRIPTION OF THE INVENTION

Unless defined otherwise, all technical and scientific terms used herein have the same meaning as is commonly understood by one of ordinary skill in the art to which this disclosure pertains.

Definitions

The term "animal meat" as used herein refers to flesh, whole meat muscle, or parts thereof, derived from an animal.

The term "condiment" as used herein refers to a prepared food item that comprises spices or other flavoring compounds and that is added to a food item after the cooking process to enhance the flavor of the food item or to complement the food item. Examples of condiments include but are not limited to mustard, mayonnaise, ketchup, chutney, soy sauce, vinegar, oils, duck sauce, salsa, Worcestershire sauce, marmite, wasabi, barbecue sauces, dressings, relish, chili sauce, dips, fruit preserves, horseradish, syrup, teriyaki sauce, and hot sauces.

The term "controlled conditions" as used herein refers to conditions that are defined by a human. Examples of conditions that can be defined by a human include but are not limited to the level of oxygenation, pH, salt concentration, temperature, and nutrient (e.g., carbon, nitrogen, sulfur) availability. A natural source grown under "controlled conditions" may produce a distribution of proteins, carbohydrates, lipids, and compounds that is not native to the natural source.

The term "dough" as used herein refers to a blend of dry ingredients ("dry mix"; e.g., proteins, carbohydrates, and lipids including liquid oils) and liquid ingredients ("liquid mix"; e.g., water, and all other ingredients added with water) from which a nutrient-dense meat structured protein product as provided herein is produced through the application of mechanical energy (e.g., spinning, agitating, shaking, shearing, pressure, turbulence, impingement, confluence, beating, friction, wave), radiation energy (e.g., microwave, electromagnetic), thermal energy (e.g., heating, steam texturizing), enzymatic activity (e.g., transglutaminase activity), chemical reagents (e.g., pH adjusting agents, kosmotropic salts, chaotropic salts, gypsum, surfactants, emulsifiers, fatty acids, amino acids), other methods that lead to protein denaturation and protein fiber alignment, or combinations of these methods, followed by fixation of the fibrous structure (e.g., by rapid temperature and/or pressure change, rapid dehydration, chemical fixation, redox), followed by any applicable post-processing steps The term "heat stable nutrient" as used herein refers to a nutrient that is functionally active or chemically or structurally unaltered at a temperature of 115° C.

The term "meat structured protein product" as used herein refers to a food product that is not derived from an animal but has structure, texture, and/or other properties comparable to those of animal meat. The term refers to both protein fibrous product and post-processed protein fibrous product unless otherwise indicated herein or clearly contradicted by context.

The term "modified natural source" as used herein refers to a natural source that is altered from its native state (e.g., mutated, genetically engineered).

The term "moisture content" and its acronym "MC" as used herein refer to the amount of moisture in a material as measured in an analytical method calculated as percentage change in mass following the evaporation of water from a sample.

The term "mouth feel" as used herein refers to the overall appeal of a food product, which stems from the combination of characteristics such as aroma, moistness, chewiness, bite force, degradation, and fattiness that together provide a satisfactory sensory experience.

The term "native" as used herein refers to what is natural (i.e., found in nature). For example, a protein that is native to a natural source is naturally produced by the natural source when the natural source is not intentionally modified by a human.

The term "natural" or "naturally occurring" as used herein refers to what is found in nature.

The term "natural source" as used herein refers to a plant, algae, fungus, or microbe.

The term "non-heat stable nutrient" as used herein refers to a nutrient that is rendered functionally inactive or is chemically or structurally altered at a temperature of 115° C.

The term "nutrient-dense condiment" as used herein refers to a condiment that comprises essential nutrients as provided herein.

The term "nutrient-dense meat structured protein product" as used herein refers to a meat structured protein product that comprises essential nutrients as provided herein.

The terms "optional" or "optionally" mean that the feature or structure may or may not be present, or that an event or circumstance may or may not occur, and that the description includes instances where a particular feature or structure is present and instances where the feature or structure is absent, or instances where the event or circumstance occurs and instances where the event or circumstance does not occur.

The term "pH adjusting agent" as used herein refers to an agent that raises or lowers the pH of a solution.

The term "post-processed protein fibrous product" as used herein refers to the food product that is obtained after a protein fibrous product has undergone post-processing. The term encompasses hydrated protein fibrous product and marinated protein fibrous product.

The term "post-processing" as used herein refers to processing the protein fibrous product undergoes after its fibrous structure is generated and fixed.

The term "protein" as used herein refers to a polymeric form of amino acids of any length, which can include coded and non-coded amino acids, chemically or biochemically modified or derivatized amino acids, and polypeptides having modified peptide backbones.

The term "protein fiber" as used herein refers to a continuous filament of discrete length made up of protein held together by intermolecular forces such as disulfide bonds, hydrogen bonds, electrostatic bonds, hydrophobic interactions, peptide strand entanglement, and Mailard reaction chemistry creating covalent cross-links between side chains of proteins.

The term "protein fibrous product" as used herein refers to the food product obtained from a dough after application of mechanical energy (e.g., spinning, agitating, shaking, shearing, pressure, turbulence, impingement, confluence, beating, friction, wave), radiation energy (e.g., microwave, electromagnetic), thermal energy (e.g., heating, steam texturizing), enzymatic activity (e.g., transglutaminase activity), chemical reagents (e.g., pH adjusting agents, kosmotropic salts, chaotropic salts, gypsum, surfactants, emulsifiers, fatty acids, amino acids), other methods that lead to protein denaturation and protein fiber alignment, or combinations of these methods, followed by fixation of the fibrous structure (e.g., by rapid temperature and/or pressure change, rapid dehydration, chemical fixation, redox).

The term "substantially aligned" as used herein refers to an arrangement of protein fibers such that a significantly high percentage of the fibers are contiguous to each other at less than about a 45° angle when viewed in a horizontal plane. A method for analyzing protein fiber arrangements is exemplified in Example 3.

The terms "a" and "an" and "the" and similar referents as used herein refer to both the singular and the plural, unless otherwise indicated herein or clearly contradicted by context.

The term "about" as used herein refers to greater or lesser than the value or range of values stated by 1/10 of the stated values, but is not intended to limit any value or range of values to only this broader definition. For instance, a value of "about 30%" means a value of between 27% and 33%. Each value or range of values preceded by the term "about" is also intended to encompass the embodiment of the stated absolute value or range of values.

Recitation of ranges of values herein are merely intended to serve as a shorthand method of referring individually to each separate value inclusively falling within the range, unless otherwise indicated herein, and each separate value is incorporated into the specification as if it were individually recited herein.

Nutrient-Dense Meat Structured Protein Products

In one aspect, provided herein are nutrient-dense meat structured protein products. The nutrient-dense meat structured protein products have several advantages. They are produced using only natural ingredients and can be devoid of allergenic compounds (e.g., gluten, soy) and of substantial amounts of unhealthy saturated fats. They comprise a high content of protein and of essential nutrients, providing nutritional components that are challenging to obtain from plant-based diets. And they have structures, textures, mouthfeel, and other properties of animal meat, enabling them to serve as substitutes for animal meat as center-plate food items.

The nutrient-dense meat structured protein products provided herein comprise at least about 5% by weight of protein. The protein may be comprised of polypeptide molecules having an identical amino acid sequence, or of a mixture of polypeptide molecules having at least 2 different amino acid sequences. In some embodiments, at least some of the protein is derived from plant. The protein may be derived from any one plant source or from multiple plant sources. In some embodiments, the protein is not derived from a plant source but is identical or similar to protein found in a plant source, for example, the protein is synthetically or biosynthetically generated but comprises polypeptide molecules that have an identical or similar amino acid sequence as polypeptide molecules found in a plant source. In some embodiments, the nutrient-dense meat structured protein products comprise between about 5% and about 90%, between about 10% and about 80%, between about 20% and about 70%, between about 30% and about 60%, between about 40% and about 50%, between about 60% and about 80%, between about 50% and about 70%, between about 40% and 60%, between about 30% and 50%, between about 10% and about 30%, between about 10% and about 50%, or between about 15% and about 35% by weight of protein. In some embodiments, the nutrient-dense meat structured protein products comprise an overall protein content of between about 3 g and about 15 g, between about 5 g and about 12 g, or between about 7 g and about 9 g per ounce. In some embodiments, the nutrient-dense meat structured protein products comprise an overall protein content of at least about 2 g, at least about 5 g, at least about 8 g, or at least about 10 g per ounce. In some embodiments, the nutrient-dense meat structured protein products comprise protein at a level of between about 10% and about 100% of the U.S. Food and Drug Administration (FDA) recommended daily intake value for protein. The protein content of a food product can be determined by a variety of methods, including but not limited to AOAC International reference methods AOAC 990.03 and AOAC 992.15. In some embodiments, the nutrient-dense meat structured protein products comprise pea protein. The pea protein may be derived from whole pea or from a component of pea in accordance with methods generally known in the art. The pea may be standard pea (i.e., nongenetically modified pea), commoditized pea, genetically modified pea, or combinations thereof.

In some embodiments, the nutrient-dense meat structured protein products provided herein comprise iron. In some such embodiments, the nutrient-dense meat structured protein products comprise at least about 0.2 mg, at least about 0.4 mg, at least about 0.6 mg, at least about 0.8 mg, or at least about 1 mg of iron per ounce. In some embodiments, the nutrient-dense meat structured protein products comprise iron at a level of between about 1 mg and about 30 mg, between about 1.5 mg and about 20 mg, between about 1.8 mg and about 18 mg, between about 1 mg and about 6 mg, between about 2 mg and about 5 mg, or between about 3 mg and about 4 mg per 113 g. In some embodiments, the nutrient-dense meat structured protein products comprise iron at a level of between about 10% and about 100% of the FDA recommended daily intake value for iron. In some embodiments, the nutrient-dense meat structured protein products comprise a similar amount of iron as an equivalent amount by weight of cooked ground beef. In some embodiments, the nutrient-dense meat structured protein products comprise more iron than an equivalent amount by weight of cooked ground beef. In some embodiments, the nutrient-dense meat structured protein products comprise at least about 1.5-fold, at least about 2-fold, at least about 2.5-fold, or at least about 3-fold as much iron as an equivalent amount by weight of cooked ground beef. Iron content of a food product can be determined by a variety of methods, including but not limited to AOAC International reference method AOAC 965.17/985.01mod.

In some embodiments, the nutrient-dense meat structured protein products provided herein comprise omega-3 fatty acids. In some such embodiments, the nutrient-dense meat structured protein products comprise at least about 0.1 g, at least about 0.2 g, at least about 0.3 g, at least about 0.4 g, or at least about 0.5 g of omega-3 fatty acids per ounce. In some embodiments, the nutrient-dense meat structured protein products comprise omega-3 fatty acids at a level of between about 25 mg and about 2 g, between about 50 mg and about 1 g, between about 50 mg and about 500 mg, between about 100 mg and about 400 mg, between about 200 mg and about 300 mg, between about 0.8 g and about 2 g, between about 1 g and about 2 g, or between about 500 mg and about 1 g per 113 g. In some embodiments, the nutrient-dense meat structured protein products comprise omega-3 fatty acids at a level of between about 10% and about 100% of the FDA recommended daily intake value for omega-3 fatty acids. In some embodiments, the nutrient-dense meat structured protein products comprise a similar amount of omega-3 fatty acids as an equivalent amount by weight of farmed Atlantic salmon meat (Exler J. (1987) Composition of Foods: Finfish and Shellfish Products. Agriculture handbook No. 8-15. Washington, D.C.: USDA). In some embodiments, the nutrient-dense meat structured protein products comprise higher levels of omega-3 fatty acids than an equivalent amount by weight of farmed Atlantic salmon meat. In some embodiments, the nutrient-dense meat structured protein products comprise at least about 1.5-fold, at least about 2-fold, at least about 2.5-fold, or at least about 3-fold as much omega-3 fatty acids as an equivalent amount by weight of farmed Atlantic salmon meat. Omega-3 fatty acid content of a food product can be determined by a variety of methods, including but not limited to AOAC International reference method AOAC Ce 1b-89.

In some embodiments, the nutrient-dense meat structured protein products provided herein comprise omega-3 fatty acid eicosapentaenoic acid (EPA). In some such embodiments, the nutrient-dense meat structured protein products comprise at least about 0.1 g, at least about 0.2 g, at least about 0.3 g, at least about 0.4 g, or at least about 0.5 g EPA per ounce. In some embodiments, the nutrient-dense meat structured protein products comprise EPA at a level of between about 0.0125 g and about 1 g, between about 0.025 g and about 0.5 g, between about 0.025 g and about 0.25 g, between about 0.05 g and about 0.2 g, between about 0.1 g and about 0.15 g, between about 0.5 g and about 1 g, or between about 0.25 g and about 0.5 g per 113 g. In some embodiments, the nutrient-dense meat structured protein products comprise EPA at a level of between about 10% and about 100% of the FDA recommended daily intake value for EPA. In some embodiments, the nutrient-dense meat structured protein products comprise a similar amount of EPA as an equivalent amount by weight of farmed Atlantic salmon meat. In some embodiments, the nutrient-dense meat structured protein products comprise higher levels of EPA than an equivalent amount by weight of farmed Atlantic salmon meat. In some embodiments, the nutrient-dense meat structured protein products comprise at least about 1.5-fold, at least about 2-fold, at least about 2.5-fold, or at least about 3-fold as much EPA as an equivalent amount by weight of farmed Atlantic salmon meat.

In some embodiments, the nutrient-dense meat structured protein products provided herein comprise omega-3 fatty acid docosahexaenoic acid (DHA). In some such embodiments, the nutrient-dense meat structured protein products comprise at least about 0.01 g, at least about 0.05 g, at least about 0.1 g, at least about 0.2 g, at least about 0.3 g, at least about 0.4 g, or at least about 0.5 g of DHA per ounce. In some embodiments, the nutrient-dense meat structured protein products comprise DHA at a level of between about 0.0125 g and about 1 g, between about 0.025 g and about 0.5 g, between about 0.025 g and about 0.25 g, between about 0.05 g and about 0.2 g, between about 0.1 g and about 0.15 g, between about 0.5 g and about 1 g, or between about 0.25 g and about 0.5 g per 113 g. In some embodiments, the nutrient-dense meat structured protein products comprise DHA at a level of between about 10% and about 100% of the FDA recommended daily intake value for DHA. In some embodiments, the nutrient-dense meat structured protein products comprise a similar amount of DHA as an equivalent amount by weight of farmed Atlantic salmon meat. In some embodiments, the nutrient-dense meat structured protein products comprise higher levels of DHA than an equivalent amount by weight of farmed Atlantic salmon meat. In some embodiments, the nutrient-dense meat structured protein products comprise at least about 1.5-fold, at least about 2-fold, at least about 2.5-fold, or at least about 3-fold as much DHA as an equivalent amount by weight of farmed Atlantic salmon meat.

In some embodiments, the nutrient-dense meat structured protein products provided herein comprise calcium. In some such embodiments, the nutrient-dense meat structured protein products comprise at least about 10 mg, at least about 20 mg, at least about 30 mg, at least about 40 mg, or at least about 50 mg of calcium per ounce. In some embodiments, the nutrient-dense meat structured protein products comprise calcium at a level of between about 40 mg and about 2 g, between about 40 mg and about 440 mg, between about 100 mg and about 1 g, between about 150 mg and about 800 mg, between about 200 mg and about 600 mg, between about 300 mg and about 500 mg, between about 1 g and about 2 g, or between about 500 mg and about 1 g per 113 g. In some embodiments, the nutrient-dense meat structured protein products comprise calcium at a level of between about 10% and about 100% of the FDA recommended daily intake value for calcium. In some embodiments, the nutrient-dense meat structured protein products comprise a similar amount of calcium as an equivalent amount by weight of 2% cow milk. In some embodiments, the nutrient-dense meat structured protein products comprise higher levels of calcium than an equivalent amount by weight of 2% cow milk. In some embodiments, the nutrient-dense meat structured protein products comprise at least about 1.5-fold, at least about 2-fold, at least about 2.5-fold, or at least about 3-fold as much calcium as an equivalent amount by weight of 2% cow milk. Calcium content of a food product can be determined by a variety of methods, including but not limited to AOAC International reference method AOAC 965.17/985.01 mod.

In one embodiment, the nutrient-dense meat structured protein products provided herein comprise antioxidants. Antioxidants are compounds that interact with and neutralize free radicals. The antioxidants may be natural or synthetic antioxidants. Examples of antioxidants include but are not limited to carotenes, ubiquinone, resveratrol, alpha-tocopherol, lutein, zeaxanthin, "2,4-(tris-3',5'-bitert-butyl-4'-hydroxybenzyl)-mesitylene (i.e., Ionox 330)", "2,4,5-trihydroxybutyrophenone", "2,6-di-tert-butylphenol", "2,6-di-tert-butyl-4-hydroxymethylphenol (i.e., Ionox 100)", "3,4-dihydroxybenzoic acid", 5-methoxy tryptamine, "6-ethoxy 1,2-dihydro-2,2,4-trimethylquinoline", acetyl gallate, alpha-carotene, alpha-hydroxybenzyl phosphinic acid, alphaketoglutarate, anoxomer, ascorbic acid and its salts, ascorbyl palmitate, ascorbyl stearate, benzyl isothiocyanate, beta naphthoflavone, beta-apo-carotenoic acid, beta-carotene, beta-carotene, butylated hydroxyanisole (BHA), butylated hydroxytoluene (BHT), caffeic acid, canthaxantin, carnosol, carvacrol, catalase, catechins, chlorogenic acid, citric acid and its salts, clove extract, coffee bean extract, di-stearyl thiodipropionate, dilauryl thiodipropionate, dodecyl gallate, edetic acid, ellagic acid, erythorbic acid, esculetin, esculin, ethyl gallate, ethyl maltol, ethylenediaminetetraacetic acid (EDTA), *eucalyptus* extract, eugenol, ferulic acid, flavanones, flavones, flavonoids, flavonoids, flavonols, fraxetin, fumaric acid, gallic acid, gentian extract, gluconic acid, glycine, gum guaiacum, hesperetin, hydroquinone, hydroxycinammic acid, hydroxyglutaric acid, hydroxytyrosol, hydroxyurea, isflavones, lactic acid and its salts, lecithin, lecithin citrate; R-alpha-lipoic acid, lutein, lycopene, malic acid, maltol, methyl gallate, mono isopropyl citrate, monoglyceride citrate, morin, N-acetylcysteine, N-hydroxysuccinic acid, "N,N'diphenylp phenylenediamine (DPPD)", natural antioxidants, nordihydroguaiaretic acid (NDGA), octyl gallate, oxalic acid, p-coumaric acid, palmityl citrate, phenothiazine, phosphates, phosphatidylcholine, phosphoric acid, phytic acid, phytylubichromel, pimento extract, polyphosphates, propyl gallate, quercetin, retinyl palmitate, rice bran extract, rosemary extract, rosmarinic acid, sage extract, sesamol, silymarin, sinapic acid, sodium erythorbate, stearyl citrate, succinic acid, superoxide dismutase (SOD), synthetic antioxidantss, syringic acid, tartaric acid, taurine, tertiary butyl hydroquinone (TBHQ), thiodipropionic acid, thymol, tocopherols, tocotrienols, trans resveratrol, trihydroxy butyrophenone, tryptamine, tyramine, tyrosol, ubiquinone, uric acid, vanillic acid, vitamin K and derivates, wheat germ oil, and zeaxanthin. In some embodiments, the nutrient-dense meat structured protein products comprise antioxidants at a level of at least about 1,841 ORAC per ounce. In some embodiments, the nutrient-dense meat structured protein products comprise at least about 1 mg, at least about 2 mg, at least about 3 mg, at least about 5 mg, at least about 10 mg, or at least about 15 mg of vitamin C per ounce. In some embodiments, the nutrient-dense meat structure protein products comprise between about 1 mg and about 100 mg, between about 6 mg and about 60 mg, or between about 20 mg and about 40 mg of vitamin C per 113 g. In some embodiments, the nutrient-dense condiments comprise at least about 100 IU, at least about 150 IU, at least about 300 IU, at least about 500 IU, at least about 1000 IU, or at least about 1250 IU of vitamin A per ounce. In some embodiments, the nutrient-dense condiments comprise between about 100 IU and about 10,000 IU, between about 500 IU and about 5,000 IU, or between about 1,000 IU and about 3,000 IU of vitamin A per 113 g. In some embodiments, the nutrient-dense condiments comprise at least about 0.75 IU, at least about 1.5 IU, at least about 3 IU, or at least about 7.5 IU of vitamin E per ounce. In some embodiments, the nutrient-dense condiments comprise between about 1 IU and about 50 IU, between about 3 IU and about 30 IU, or between about 10 IU and about 20 IU of vitamin E per 113 g. In some embodiments, the nutrient-dense condiments comprise at least about 1 ug, at least about 1.75 ug, at least about 3 ug, at least about 5 ug, at least about 10 ug, or at least about 15 ug of selenium per ounce. In some embodiments, the nutrient-dense condiments comprise between about 1 ug and about 100 ug, between about 7 ug and about 70 ug, or between about 25 ug and about 50 ug of selenium per 113 g. In some embodiments, the nutrient-dense meat structured protein products comprise one or more antioxidants at a level of between about 10% and about 100% of the FDA recommended daily intake value for the one or more antioxidants. In some embodiments, the nutrient-dense meat structured protein products comprise a similar amount of antioxidants as an equivalent amount by weight of blueberries. In some embodiments, the nutrient-dense meat structured protein products comprise higher levels of antioxidants than an equivalent amount by weight of blueberries. In some embodiments, the nutrient-dense meat structured protein products comprise at least about 1.5-fold, at least about 2-fold, at least about 2.5-fold, or at least about 3-fold as much antioxidants as an equivalent amount by weight of blueberries. The vitamin C content of a food item can be determined by a variety of methods, including by HPLC-UV determination (see Fontana et al., 2006, Food Chemistry 94: 626-631.) or according to JOFCA#94 (626-631) Modified. The water soluble vitamins content of a food item can be determined by a variety of methods, including by JOFCA#18 9751-758) Modified. The beta-carotene content of a food item can be determined by a variety of methods, including by HPLC analysis (see Weissenberg et al., 1997, Chromatographia 46 (7/8):399-403).

In one embodiment, the nutrient-dense meat structured protein products provided herein comprise vitamin B-12. In some embodiments, the nutrient-dense meat structured protein products comprise at least about 0.3 ug, at least about 0.5 ug, at least about 0.7 ug, at least about 0.9 ug, or at least about 1.1 ug of vitamin B-12 per ounce. In some embodiments, the nutrient-dense meat structured protein products comprise vitamin B-12 at a level of between about 0.4 ug and about 7.5 ug, between about 0.6 ug and about 6 ug, between about 0.8 ug and about 7.2 ug, between about 1.6 ug and about 5.6 ug, between about 2 ug and about 4.4 ug, between about 2.4 ug and about 4.8 ug, between about 3.2 ug and about 4 ug per 113 g. In some embodiments, the nutrient-dense meat structured protein products comprise vitamin B-12 at a level of between about 10% and about 100% of the FDA recommended daily intake value for vitamin B-12. In some embodiments, the nutrient-dense meat structured protein products comprise a similar amount of vitamin B-12 as an equivalent amount by weight of cooked ground beef. In some embodiments, the nutrient-dense meat structured protein products comprise higher levels of vitamin B-12 than an equivalent amount by weight of cooked animal meat. In some embodiments, the nutrient-dense meat structured protein products comprise at least about 1.5-fold, at least about 2-fold, at least about 2.5-fold, or at least about 3-fold as much vitamin B-12 as an equivalent amount by weight of cooked animal meat. The vitamin B content of a food item can be determined by a variety of methods, including by reversed-phase liquid chromatography (see Vinas et al., 2003, Journal of Chromatography A 1007: 77-84). The vitamin B-12 content of a food product can be determined by a variety of methods, including but not limited to AOAC International reference method AOAC 952.20/45.2.02.

The nutrient-dense meat structured protein products provided herein can comprise lipid. Without being bound by theory, it is believed that lipid may prevent the sensation of drying during chewing. Examples of suitable lipids include but are not limited to conjugated fatty acids, eicosanoids, palmitic acid, glycolipids (e.g., cerebrosides, galactolipids), glycosphingolipids, lipopolysaccharides, gangliosides), membrane lipids (e.g., ceramides, sphingomyelin, bactoprenol), glycerides, second messenger signaling lipid (e.g., diglyceride), triglycerides, prenol lipids, prostaglandins, saccharolipids, oils (e.g., non-essential oils, essential oils, almond oil, aloe vera oil, apricot kernel oil, avocado oil, baobab oil, calendula oil, canola oil, corn oil, cottonseed oil, evening primrose oil, grape oil, grape seed oil, hazelnut oil, jojoba oil, linseed oil, macadamia oil, natural oils, neem oil, non-hydrogenated oils, olive oil, palm oil, partially hydrogenated oils, peanut oil, rapeseed oil, sesame oil, soybean oil, sunflower oil, synthetic oils, vegetable oil), omega-fatty acids (e.g., arachidonic acid, omega-3-fatty acids, omega-6-fatty acids, omega-7-fatty acids, omega-9-fatty acids), and phospholipids (e.g., cardiolipin, ceramide phosphocholines, ceramide phosphoethanolamines, glycerophospholipids, phasphatidic acid, phosphatidylcholine, phosphatidylethanolamine, phosphatidylinositol, phosphospingolipids, phsophatidylserine). In some embodiments, at least some of the lipid is derived from plant. The lipid may be derived from any one plant source or from multiple plant sources. In some embodiments, the lipid is not derived from a plant source but is identical or similar to lipid found in a plant source, for example, the lipid is synthetically or biosynthetically generated but is identical or similar to lipid found in a plant source. In some embodiments, the nutrient-dense meat structured protein products comprise between about 1% and about 10%, between about 2% and about 8%, between about 4% and about 6%, between about 1% and about 3%, between about 2% and about 4%, between about 3% and about 5%, between about 4% and about 6%, between about 6% and about 8%, between about 0.5% and about 5%, between about 1% and about 4%, between about 1% and about 3%, between about 1% and about 2%, between about 1.5% and about 2.5%, or between about 2.5% and about 5% by weight of lipid. Lipid content of a food product can be determined by a variety of methods, including but not limited to AOAC International reference method AOAC 954.02. In some embodiments, the nutrient-dense meat structured protein products comprise less than about 2%, less than about 1%, less than about 0.5%, less than about 0.25%, less than about 0.1%, or less than about 0.005% by weight of saturated fat.

The nutrient-dense meat structured protein products provided herein can comprise carbohydrate. A variety of ingredients may be used as an or part of the carbohydrate, including but not limited to starch, flour, edible fiber, and combinations thereof. Examples of suitable starches include but are not limited to maltodextrin, inulin, fructo oligosaccharides, pectin, caboxymethyl cellulose, guar gum, corn starch, oat starch, potato starch, rice starch, and wheat starch. Examples of suitable flour include but are not limited to amaranth flour, oat flour, *quinoa* flour, rice flour, rye flour, sorghum flour, soy flour, wheat flour, and corn flour. Examples of suitable edible fiber include but are not limited to barley bran, carrot fiber, citrus fiber, corn bran, soluble dietary fiber, insoluble dietary fiber, oat bran, pea fiber, rice bran, head husks, soy fiber, soy polysaccharide, wheat bran, and wood pulp cellulose. In some embodiments, at least some of the carbohydrate is derived from plant. The carbohydrate may be derived from any one plant source or from multiple plant sources. In some embodiments, the carbohydrate is not derived from a plant source but is identical or similar to carbohydrate found in a plant source, for example, the carbohydrate is synthetically or biosynthetically generated but comprises molecules that have an identical or similar primary structure as molecules found in a plant source. In some embodiments, the nutrient-dense meat structured protein products provided herein comprise between about 1% and about 20%, between about 1% and about 10%, between about 1% and about 5%, between about 1% and about 3%, between about 5% and about 15%, between about 0.5% and about 10%, between about 0.5% and about 5%, between about 0.5% and about 2.5%, between about 0.5% and about 1.5%, or between about 2.5% and about 7.5% by weight of carbohydrate. In some embodiments, the nutrient-dense meat structured protein products comprise between about 0.2% to about 3% or between about 0.1% to about 1.5% by weight of starch. In some embodiments, the nutrient-dense meat structured protein products comprise pea starch. In some such embodiments, the nutrient-dense meat structured protein products provided herein comprise between about 0.2% and about 3%, between about 1% and about 3%, between about 2% and about 3%, between about 0.1% and about 1.5%, between about 0.5% and about 1.5%, or between about 1% and about 1.5% by weight of *Pisum sativum* starch. In some embodiments, the nutrient-dense meat structured protein products comprise between about 0.1% and about 5%, between about 0.1% and about 3%, between about 0.1% and about 2%, between about 0.1% and about 1%, between about 0.05% and about 2.5%, between about 0.05% and about 1.5%, between about 0.05% and about 1%, or between about 0.0.5% and about 0.5% by weight of edible fiber.

The nutrient-dense meat structured protein products provided herein comprise a moisture content (MC) of at least about 30%. Without being bound by theory, it is believed that a high MC may prevent the sensation of drying during chewing. In some embodiments, the nutrient-dense meat structured protein products provided herein comprise a MC of between about 30% and about 70%, between about 40% and about 60%, between about 40% and about 50%, between about 30% and about 60%, between about 50% and about 70%, between about 55% and about 65%, between about 50% and about 85%, between about 60% and about 80%, between about 50% and about 70%, between about 70% and about 80%, between about 75% and about 85%, or between about 65% and about 90% by weight. A method for determining the MC of a nutrient-dense meat structured protein product is exemplified in Example 4.

In some embodiments, the nutrient-dense meat structured protein products provided herein have an alkaline pH of at least 7.05. In some embodiments, the nutrient-dense meat structured protein products have a pH of between 7.2 and about 12, between 7.2 and about 10, between 7.4 and about 10.0, between 7.6 and about 9.0, between 7.8 and about 9.0, between about 8.0 and about 9.0, or between about 8 and about 10.

In some embodiments, the nutrient-dense meat structured protein product provided herein may comprise a pH adjusting agent. Suitable pH adjusting agents include those that lower the pH of the dough (acidic pH adjusting agents having a pH below 7) and those that raise the pH of the dough (basic pH adjusting agents having a pH above 7). In some such embodiments, the pH of the pH adjusting agents is lower than 7, between 6.95 and about 2, between 6.95 and about 4, between about 4 and about 2, higher than 7.05, between 7.05 and about 12, between 7.05 and about 10, between 7.05 and about 8, between about 9 and about 12, or between about 10 and about 12. The pH adjusting agent may be organic or inorganic. Examples of suitable pH adjusting agents include but are not limited to salts, ionic salts, alkali metals, alkaline earth metals, and monovalent or divalent cationic metals. Examples of suitable salts include but are not limited to hydroxides, carbonates, bicarbonates, chlorides, gluconates, acetates, or sulfides. Examples of suitable monovalent or divalent cationic metals include but are not limited to calcium, sodium, potassium, and magnesium. Examples of suitable acidic pH adjusting agents include but are not limited to acetic acid, hydrochloric acid, citric acid, succinic acid, and combinations thereof. Examples of suitable basic pH adjusting agents include but are not limited to potassium bicarbonate, sodium bicarbonate, sodium hydroxide, potassium hydroxide, calcium hydroxide, ethanolamine, calcium bicarbonate, calcium hydroxide, ferrous hydroxide, lime, calcium carbonate, trisodium phosphate, and combinations thereof. In exemplary embodiments, the pH adjusting agent is a food grade edible acid or food grade edible base.

In some embodiments, the nutrient-dense meat structured protein products provided herein comprise between about 0.1% and about 10%, between about 0.1% and about 8%, between about 0.1% and about 6%, between about 0.1% and about 0.7%, between about 1% and about 3%, between about 1% and about 7%, between about 1% and about 5%, or between about 1% and about 3% by weight potassium bicarbonate. In some embodiments, the nutrient-dense meat structured protein products provided herein comprise between about 0.1% and about 10%, between about 0.1% and about 8%, between about 0.1% and about 6%, between about 0.1% and about 0.7%, between about 1% and about 3%, between about 1% and about 7%, between about 1% and 5%, or between about 1% and about 3% by weight sodium bicarbonate. In some embodiments, the nutrient-dense meat structured protein products provided herein comprise between about 0.1% and about 5%, between about 0.1% and about 3%, between about 0.1% and about 2%, between about 0.1% and about 1%, between about 0.2% and about 0.5%, or between about 0.4% and about 1% by weight calcium carbonate. In some embodiments, the nutrient-dense meat structured protein products provided herein comprise between about 0.1% and about 3%, between about 0.1% and about 2%, between about 0.1% and about 1%, between about 0.1% and about 0.5%, or between about 0.1% and about 0.25% by weight calcium hydroxide. In some embodiments, the nutrient-dense meat structured protein products comprise between about 0.005% and about 0.1%, between about 0.005% and about 0.05%, or between about 0.005% and about 0.025% by weight of potassium hydroxide. In some embodiments, the nutrient-dense meat structured protein products comprise between about 0.005% and about 0.1%, between about 0.005% and about 0.05%, or between about 0.005% and about 0.025% by weight of sodium hydroxide.

It is also within the scope of the invention that the nutrient-dense meat structured protein products provided herein comprise small amounts (i.e., 2% or less by weight) of protein, carbohydrate, lipid, or other ingredients derived from animal (e.g., albumin or collagen).

The nutrient-dense meat structured protein products provided herein have a microscopic protein structure similar to that of animal meat. Specifically, the nutrient-dense meat structured protein products are made up of protein fibers that are substantially aligned and that form a three-dimensional protein network. Methods for determining the degree of protein fiber alignment and three-dimensional protein network are known in the art and include visual determination based upon photographs and micrographic images, as exemplified in Example 3. Without being bound by theory, it is believed that the microscopic protein structures of the nutrient-dense meat structured protein products provided herein impart physical, textural, and sensory properties that are similar to those of cooked animal meat, wherein the aligned and interconnected protein fibers may impart cohesion and firmness, and the open spaces in the protein network may weaken the integrity of the fibrous structures and tenderize the nutrient-dense meat structured protein products while also providing pockets for capturing water, carbohydrates, salts, lipids, flavorings, and other materials that are slowly released during chewing to lubricate the shearing process and to impart other meat-like sensory characteristics. In some embodiments, in the nutrient-dense meat structured protein products provided herein at least about 55%, at least about 65%, at least about 75%, at least about 85%, or at least about 95% of the protein fibers are substantially aligned.

The nutrient-dense meat structured protein products provided herein have eating qualities and mouth feels that are substantially similar to those of cooked animal meat. For example, nutrient-dense meat structured protein products can have similar moisture, hardness/firmness, and overall texture compared to cooked 80/20 ground beef. The eating qualities and mouth feels of a nutrient-dense meat structured protein product can be determined using a panel of human sensory experts.

In some embodiments, the nutrient-dense meat structured protein products provided herein are gluten-free. In some embodiments, the nutrient-dense meat structured protein products comprise no cross-linking agent that could facilitate filament formation, including but not limited to glucomannan, beta-1,3-glucan, transglutaminase, calcium salts, and magnesium salts. In some embodiments, the nutrient-dense meat structured protein products are vegan.

The nutrient-dense meat structured protein products provided herein may have any shape and form. Exemplary shapes include but are not limited to crumbles, strips, slabs, steaks, cutlets, patties, nuggets, loafs, tube-like, noodle-like, chunks, poppers, and cube-shaped pieces. In some embodiments, the nutrient-dense meat structured protein products have the shape of crumbles with dimensions of between about 2 mm and about 25 mm width, between about 2 mm and about 25 mm thickness, and between about 2 mm and about 50 mm length. In some embodiments, the nutrient-dense meat structured protein products have the shape of strips with widths of between about 1 cm and about 8 cm and lengths of between about 5 cm and about 30 cm. In some embodiments, the nutrient-dense meat structured protein products provided herein have the shape of slabs with widths of between about 30 mm and about 110 cm. In some embodiments, the nutrient-dense meat structured protein products provided herein have a thickness of between about 2 mm and about 15 mm, between about 3 mm and about 12 mm, between about 4 mm and about 10 mm, or between about 5 mm and about 8 mm. In some embodiments, the nutrient-dense meat structured protein products provided herein have the same thickness across at least about 95%, at least about 90%, at least about 80%, at least about 70%, at least about 60%, or at least about 50% of their length or width. In some embodiments, the nutrient-dense meat structured protein products provided herein have the same thickness across no more than about 50%, no more than about 40%, no more than about 30%, no more than about 20%, or no more than about 10% of their width or length.

The nutrient-dense meat structured protein products can be sliced, cut, ground, shredded, grated, or otherwise processed, or left unprocessed. Examples of sliced forms include but are not limited to dried meats, cured meats, and sliced lunch meats. The nutrient-dense meat structured protein products may also be stuffed into permeable or impermeable casings to form sausages. In some embodiments, the nutrient-dense meat structured protein products provided herein are shredded and then bound together, chunked and formed, ground and formed, or chopped and formed according in compliance with Food Standards and Labeling Policy Book (USDA, August 2005) guidelines as pertaining to animal jerky.

In some embodiments, the nutrient-dense meat structured protein products provided herein are shaped into patties. The patties can have any shape, including but not limited to square, rectangular, circular, and non-geometric. In some embodiments, the patties are circular and have diameters of between about 80 mm and 100 mm and thicknesses of between about 4 mm and about 85 mm. Patty cohesiveness can be achieved by the addition of a binding agent. Examples of suitable binding agents include but are not limited to carob bean gum, cornstarch, dried whole eggs, dried egg whites, gum arabic, konjac flour maltodextrin, potato flakes, tapioca starch, wheat gluten, vegetable gum, carageenan, methylcellulose, and xanthan gum. A suitable binding agent can be identified by titrating different binding agents against the cohesiveness and fracturability of the patty. In some embodiments, the binding agent is carageenan. In other embodiments, the binding agent is methyl cellulose. In preferred embodiments, the binding agent is a mixture of carageenan and methylcellulose. Patty formation is exemplified in Example 1.

The nutrient-dense meat structured protein products provided herein may be prepared for human or animal consumption. They may be cooked, partially cooked, or frozen either in uncooked, partially cooked, or cooked state. Cooking may include frying either as sautéing or as deep-frying, baking, smoking, impingement cooking, steaming, and combinations thereof. In some embodiments, the nutrient-dense meat structured protein products are used in cooked meals, including but not limited to soups, burritos, chilis, sandwiches, lasagnes, pasta sauces, stews, kebabs, pizza toppings, and meat sticks. In some embodiments, the nutrient-dense meat structured protein products are mixed with other protein products, including but not limited to other plant-derived products and/or animal meat.

Process for Producing Nutrient-Dense Meat Structured Protein Products

In another aspect, provided herein are methods for producing the nutrient-dense meat structured protein products provided herein.

A variety of production processes may be utilized to produce the nutrient-dense meat structured protein products provided herein. Suitable processes generally comprise three or four steps: (1) initial blending of liquid and dry mixes to form a dough, (2) shearing and heating to denature proteins and to produce aligned protein fibers (e.g., via application of mechanical energy [e.g., spinning, agitating, shaking, shearing, pressure, turbulence, impingement, confluence, beating, friction, wave], radiation energy [e.g., microwave, electromagnetic], thermal energy [e.g., heating, steam texturizing], enzymatic activity [e.g., transglutaminase activity], chemical reagents [e.g., pH adjusting agents, kosmotropic salts, chaotropic salts, gypsum, surfactants, emulsifiers, fatty acids, amino acids]), (3) setting to fix the fibrous structure (e.g., via rapid temperature and/or pressure change, rapid dehydration, redox, or chemical fixation), and, depending on the nutrient, (4) post-processing. Any of these processes may be used to produce the nutrient-dense meat structured protein products provided herein.

Such production processes are generally well known in the art (see, for example, provisional patent application U.S. 62/111,371, which is incorporated herein in its entirely).

In some embodiments, the dough comprises iron. In some such embodiments, the dough comprises iron at a level of between about 0.25 and about 7.5 mg, between about 0.375 mg and about 5 mg, between about 0.45 mg and about 4.5 mg between about 0.25 mg and about 1.5 mg, between about 0.5 mg and about 1.25 mg, between about 0.75 mg and about 1 mg per ounce, at least about 0.2 mg, at least about 0.4 mg, at least about 0.6 mg, at least about 0.8 mg, or at least about 1 mg per ounce. The iron may be added to the dough in any form, including but not limited to fulvic acid, natural extracts (e.g. curry leaf extract), and ferrous orthophosphate.

In some embodiments, the dough comprises calcium. In some such embodiments, the dough comprises calcium at a level of between about 10 mg and 500 mg, between about 10 mg and about 110 mg, between about 25 mg and about 250 mg, between about 35 mg and about 200 mg, between about 50 mg and about 150 mg, between about 75 mg and about 125 mg, between about 250 mg and about 500 mg, between about 125 mg and about 250 mg, at least about 10 mg, at least about 20 mg, at least about 30 mg, at least about 40 mg, or at least about 50 mg per ounce. The calcium may be added to the dough in any form, including but not limited to hydrilla and gypsum.

In preferred embodiments, the nutrient-dense meat structured protein products provided herein are rendered nutrient-dense during post-processing (e.g., during hydrating or marinating, or via mixing with the protein fibrous product, the hydrated protein fibrous product, or the marinated protein fibrous product). Such embodiments are preferred whenever the nutrients are heat labile and likely to be degraded or inactivated in the high temperatures and pressures used during thermoplastic extrusion or other production process, or when their presence can be detrimental to the formation of protein fibers. In particular, delaying introduction of antioxidants and omega-3 fatty acids can be advantageous because antioxidants are heat labile and omega-3 fatty acids may inhibit protein fiber formation. In some such embodiments, meat structured protein products are post-processed in a solution that comprises omega-3 fatty acids. The omega-3 fatty acids may be added to the solution in any form, including but not limited to natural seed oils (e.g., flax seed oil, sacha inchi oil, hemp seed oil, chia seed oil). In some such embodiments, meat structured protein products are post-processed in a solution that comprises omega-3 fatty acid eicosapentaenoic acid (EPA). The EPA may be added to the solution in any form, including but not limited to natural oils (e.g. oil extracted from algae, fish oils, krill oil, cod liver oil). In some such embodiments, meat structured protein products are post-processed in a solution that comprises omega-3 fatty acid docosahexaenoic acid (DHA). The DHA may be added to the solution in any form, including but not limited to natural oils (e.g. oil extracted from algae, fish oils, hill oil, cod liver oil). In some such embodiments, meat structured protein products are post-processed in a solution that comprises antioxidants. The antioxidants may be added to the solution in any form, including but not limited to enzymatic sources (e.g., chaga mushrooms). In some such embodiments, meat structured protein products are post-processed in a solution that comprises vitamin B-12. The vitamin B-12 may be added to the solution in any form, including but not limited to *hydrilla, spirulina*, and cyanocobalamin. A method for producing nutrient-dense meat structured protein products via post-processing is exemplified in Example 1.

In some embodiments, the nutrient-dense meat structured protein products provided herein are generated by thermoplastic extrusion or other production process wherein the dough has an alkaline pH of at least 7.05. In some embodiments, the dough has a pH of between 7.05 and about 12, between 7.05 and 7.5, between 7.05 and about 8, between 7.05 and about 9, between 7.1 and 7.25, between 7.15 and 7.3, between 7.4 and about 8.2, between 7.5 and about 9, or between about 9 and about 10. It has been discovered that producing a nutrient-dense meat structured protein product under conditions of alkaline pH results in nutrient-dense meat structured protein products with improved animal meat-like qualities. The alkaline pH of the dough may be established upon blending of the dry and liquid mixes due to the pH of the individual dry and liquid ingredients without addition of additional pH adjusting agent. Alternatively, the alkaline pH is established by the addition of a pH adjusting agent to the dough. The pH adjusting agent may be added to the dough in dry form (e.g, mixed with dry ingredients in the dry mix) or in liquid form (e.g., mixed with water of the liquid mix). Alternatively, the pH-adjusting agent may be contacted with the protein fibrous product after it has been produced, or added during post-processing. Suitable pH adjusting agents include those that lower the pH of the dough (acidic pH adjusting agents having a pH below about 7) or those that raise the pH of the dough (basic pH adjusting agents having a pH above about 7). In some such embodiments, the pH of the pH adjusting agents is lower than 7, between 6.95 and about 2, between 6.95 and about 4, between about 4 and about 2, higher than 7.05, between 7.05 and about 12, between 7.05 and about 10, between 7.05 and about 8, between about 9 and about 12, or between about 10 and about 12. Thus, in some embodiments, the addition of the pH adjusting agent lowers the pH of the dough to between 7.05 and about 12, between 7.05 and 7.5, between 7.05 and about 8, between 7.05 and about 9, between 7.1 and 7.25, between 7.15 and 7.3, between 7.4 and about 8.2, between 7.5 and about 9, or between about 9 and about 10, and in other embodiments, the addition of the pH adjusting agent raises the pH of the dough to between 7.05 and about 12, between 7.05 and 7.5, between 7.05 and about 8, between 7.05 and about 9, between 7.1 and 7.25, between 7.15 and 7.3, between 7.4 and about 8.2, between 7.5 and about 9, or between about 9 and about 10.

The pH adjusting agent may be organic or inorganic. Examples of suitable pH adjusting agents include but are not limited to salts, ionic salts, alkali metals, alkaline earth metals, and monovalent or divalent cationic metals. Examples of suitable salts include but are not limited to hydroxides, carbonates, bicarbonates, chlorides, gluconates, acetates, or sulfides. Examples of suitable monovalent or divalent cationic metals include but are not limited to calcium, sodium, potassium, and magnesium. Examples of suitable acidic pH adjusting agents include but are not limited to acetic acid, hydrochloric acid, citric acid, succinic acid, and combinations thereof. Examples of suitable basic pH adjusting agents include but are not limited to potassium bicarbonate, sodium bicarbonate, sodium hydroxide, potassium hydroxide, calcium hydroxide, ethanolamine, calcium bicarbonate, calcium hydroxide, ferrous hydroxide, lime, calcium carbonate, trisodium phosphate, and combinations thereof. In exemplary embodiments, the pH adjusting agent is a food grade edible acid or food grade edible base.

As will be appreciated by a skilled artisan, the amount of pH adjusting agent utilized can and will vary depending upon several parameters, including, the agent selected; the desired pH; the pH of the dry and wet mixes; the type of protein, carbohydrate, lipid or other ingredient utilized; and the stage of manufacture at which the agent is added. In some embodiments, the dough comprises between about 0.1% and about 10%, between about 0.1% and about 8%, between about 0.1% and about 6%, between about 0.1% and about 0.7%, between about 1% and about 3%, between about 1% and about 7%, between about 1% and 5%, or between about 1% and about 3% by weight potassium bicarbonate. In some embodiments, the dough comprises between about 0.1% and about 10%, between about 0.1% and about 8%, between about 0.1% and about 6%, between about 0.1% and about 0.7%, between about 1% and about 3%, between about 1% and about 7%, between about 1% and 5%, or between about 1% and about 3% by weight sodium bicarbonate. In some embodiments, the dough comprises between about 0.1% and about 5%, between about 0.1% and about 3%, between about 0.1% and about 2%, between about 0.1% and about 1%, between about 0.2% and about 0.5%, or between about 0.4% and about 1% by weight calcium carbonate. In some embodiments, the dough comprises between about 0.1% and about 3%, between about 0.1% and about 2%, between about 0.1% and about 1%, between about 0.1% and about 0.5%, or between about 0.1% and about 0.25% by weight calcium hydroxide. In some embodiments, the dough comprises between about 0.005% and about 0.1%, between about 0.005% and about 0.05%, or between about 0.005% and about 0.025% by weight of potassium hydroxide. In some embodiments, the dough comprises between about 0.005% and about 0.1%, between about 0.005% and about 0.05%, or between about 0.005% and about 0.025% by weight of sodium hydroxide.

In some embodiments, the dough comprises a mixture of two or more pH adjusting agents. Such embodiments are preferred, for example, when a single pH adjusting agent has adverse effects on other attributes of the meat structured protein products, for example on taste, color, appearance, and the like. For example, a high content of potassium bicarbonate in the dough may have detrimental effects on the taste of nutrient-dense meat structured protein products. Therefore, in some embodiments, the dough comprises potassium bicarbonate and sodium hydroxide and/or potassium hydroxide. In some such embodiments, the dough comprises between about 0.1% and about 3% by weight of potassium bicarbonate and between about 0.02% and about 0.15% by weight of sodium hydroxide or potassium hydroxide. In some embodiments, the dough comprises between 2 and 44 ppm potassium hydroxide and 2.5% potassium bicarbonate. Other methods for reducing adverse effects of the pH adjusting agent include but are not limited to pre-incubating the dry mix with water and the pH adjusting agent, optionally accompanied with increased mixing, heating, microwaving, or sonicating, or masking the adverse effects with other ingredients in the dough.

Other Ingredients

The doughs and nutrient-dense meat structured protein products provided herein may comprise various other ingredients. In most embodiments, the doughs and nutrient-dense meat structured protein products comprise any one of these other ingredients at between about 0.01% and about 5% by weight.

Examples of such ingredients include but are not limited to amino acids and amino acid derivatives (e.g., 1-aminocyclopropane-1-carboxylic acid, 2-aminoisobutyric acid, alanine, arginine, aspartic acid, canavanine, catecholamine, citruline, cysteine, essential amino acids, glutamate, glutamic acid, glutamine, glycine, histidine, homocysteine, hydroxyproline, hypusine, isoleucine, lanthionine, leucine, lysine, lysinoalanine, methionine, mimosine, non-essential amino acids, ornithine, phenylalanine, phenylpropanoids, photoleucine, photomethionine, photoreactive amino acids, proline, pyrrolysine, selenocysteine, serine, threonine, tryptophan, tyrosine, valine), anti-inflammatory agents (e.g., leukotriene antagonists, lipoxins, resolvins), antibiotics (e.g., alamethicin, erythromycin, tetracyclines), antimicrobial agents (e.g., potassium sorbate), antiparasitic agents (e.g., avermectins), buffering agents (e.g., citrate), clotting agents (e.g., thromboxane), coagulants (e.g., fumarate), coenzymes (e.g., coenzyme A, coenzyme C, s-adnosylmethionine, vitamin derivatives), crosslinking agents (e.g., beta 1,3 glucan transglutaminase, magnesium salts), dairy protein (e.g., casein, whey protein), dietary minerals (e.g., ammonium, fat soluble minerals, gypsum, magnesium, potassium, aluminum), disaccharides (e.g., lactose, maltose, trehalose), edulcorants (e.g., artifical sweeteners, corn sweeteners, sugars), egg protein (e.g., ovalbumin, ovoglobulin, ovomucin, ovomucoid, ovotransferrin, ovovitella, ovovitellin, albumin globulin, vitellin), elasticizing agents (e.g., gluten), emulsifiers (e.g., lecithin, lecithins), enzymes (e.g., hydrolase, oxidoreductase, peroxidase), other essential nutrients (e.g., alpha-linolenic acid, gamma-linolenic acid, linoleic acid, zinc), fat soluble compounds, flavones (e.g., apigenin, chrysin, luteolin, flavonols, daemfero, datiscetin, myricetin), glycoproteins, gums (e.g., carob bean gum, guar gum, tragacanth gum, xanthan gum), hemoproteins (e.g., hemoglobin, leghemoglobin, myoglobin), humectants (e.g., polyethylene glycol, propylene glycol, sorbitol, xylitol), isoprenes, isoprenoid pathway compounds (e.g., mevalonic acid, dimethylallyl pyrophosphate, isopentenyl pyrophosphate), isoprenoids or isoprenoid derivatives (e.g., dolichols, polyprenols), liver X receptor (LXR) agonists and antagonists, meat proteins (e.g., collagen), mechanically separated meat, metabolic pathway intermediates (e.g., oxaloacetate, succinyl-CoA), monosaccharides (e.g., fructose, galactose, glucose, lactose, lyxose, maltose, manose, ribose, ribulose, xylulose), neuroactive compounds (e.g., anandamide, cannabinoids, cortisol, endocannabinoids, gamma-aminobutyric acid, inositol), neutraceuticals, nucleic acids (e.g., DNA, RNA, rRNA, tRNA), nutritional supplements (e.g., carnitine, fumarate, glucosamine), oilsoluble compounds, organ meat, oxidizing agents (e.g., quinones), partially defatted tissue and blood serum proteins, plasticizing materials, polyols (e.g., alklyne glycols, butanediols, glycerine, glycerol, glycerol, mannitol, propylene glycol, sorbitol, xylitol), polysaccharides (e.g., pectin, maltodextrin, glycogen, inulin), porphyrins, secondary metabolites (e.g., polyketides), secosteroids, spices, steroids (e.g., C18-carbon containing steroids, C19-carbon containing steroids, C21-carbon containing steroids, cholesterol, cycloartenol, estradiol, lanosterol, squalene), sterols (e.g., betasitosterol, brassicasterol, cholesterol, ergosterol, lanosterol, oxysterols, phytosterols, stigmasterol), tannins (e.g., ellagic tannins, ellagic tannins from roasted oak wood, gallic tannins, proanthocyanidin tannins from aromatic grape skin, proanthocyanidin tannins from grape seeds, proanthocyanidin tannins from grape skin, profisetinidin tannins, tannins from green tea leaves, tannins from sangre de drago), terpenes (e.g., diterpenes, monoterpenes, sesquiterpene, squalane, tetraterpenes, triterpenes), thickening agents (e.g., guar gum, pectin, xantham gum, agar, alginic acid and its salts, carboxymethyl cellulose, carrageenan and its salts, gums, modified starches, pectins, processed Eucheuma seaweed, sodium carboxymethyl cellulose, tara gum), other vitamins (e.g., alpha-tocopherol, alpha-tocotrienol, beta-tocopherol, beta-tocotrienol, deltatocopherol, delta-tocotrienols, fat soluble vitamins, gamma-tocopherol, gamma-tocotrienol, pantothenic acid, vitamin A, vitamin E, vitamin K, water soluble vitamins), water-soluble compounds, wax esters, and xenoestrogens (e.g., phytoestrogens).

Further examples include but are not limited to coloring agents (e.g., FD&C (Food Drug & cosmetics) Red Nos. 14 (erythrosine), FD&C Red Nos. 17 (allura red), FD&C Red Nos. 3 (carmosine), FD&C Red Nos. 4 (fast red E), FD&C Red Nos. 40 (allura red AC), FD&C Red Nos. 7 (ponceau 4R), FD&C Red Nos. 9 (amaranth), FD&C Yellow Nos. 13 (quinoline yellow), FD&C Yellow Nos. 5 (tartazine), FD&C Yellow Nos. 6 (sunset yellow), artificial colorants, natural colorants, titanium oxide, annatto, anthocyanins, beet juice, beta-APE 8 carotenal, beta-carotene, black currant, burnt sugar, canthaxanthin, caramel, carmine/carminic acid, cochineal extract, curcumin, lutein, mixed carotenoids, monascus, paprika, red cabbage juice, riboflavin, saffron, titanium dioxide, turmeric).

Further examples include but are not limited to flavor enhancers and flavoring agents (e.g., 5'-ribonucleotide salts, glumatic acid salts, glycine salts, guanylic acid salts, hydrolyzed proteins, hydrolyzed vegetable proteins, insomniac acid salts, monosodium glutamate, sodium chloride, galacto-oligosaccharides, sorbitol, animal meat flavor, animal meat oil, artificial flavoring agents, aspartamine, fumarate, garlic flavor, herb flavor, malate, natural flavoring agents, natural smoke extract, natural smoke solution, onion flavor, shiitake extract, spice extract, spice oil, sugars, yeast extract).

The ingredients can be native to one or more natural sources; produced by one or more modified natural sources; produced by one or more natural sources or modified natural sources under controlled conditions (e.g., aerobic conditions, anaerobic conditions, pH changes, salt conditions, temperature changes, nutrient [e.g., carbon, nitrogen, sulfur] limitations), or produced synthetically.

Natural Source/Modified Natural Source

The protein, lipid, carbohydrate, iron, omega-3 fatty acids, calcium, antioxidants, vitamin B-12, or other ingredients of the nutrient-dense meat structured protein products provided herein may be derived from one or more natural or modified natural sources.

Suitable natural sources are naturally occurring plants, algae, fungi, or microbes.

Examples of suitable plants include but are not limited to spermatophytes (spermatophyta), acrogymnospermae, angiosperms (magnoliophyta), ginkgoidae, pinidae, mesangiospermae, cycads, *Ginkgo*, conifers, gnetophytes, *ginkgo biloba*, cypress, junipers, *thuja*, cedarwood, pines, *angelica*, caraway, coriander, cumin, fennel, parsley, dill, dandelion, helichrysum, marigold, mugwort, safflower, camomile, lettuce, wormwood, calendula, citronella, sages, thyme, chia seed, mustard, olive, coffee, *capsicum*, eggplant, paprika, cranberry, kiwi, vegetable plants (e.g., carrot, celery), *tagetes*, tansy, tarragon, sunflower, wintergreen, basil, hyssop, lavender, lemon *verbena*, marjoram, melissa, patchouli, pennyroyoal, peppermint, rosemary, sesame, spearmint, primroses, samara, pepper, pimento, potato, sweet potato, tomato, blueberry, nightshades, *petunia*, morning glory, lilac, jasmin, honeysuckle, snapdragon, *psyllium*, wormseed, buckwheat, amaranth, chard, *quinoa*, spinach, rhubarb, jojoba, cypselea, chlorella, manila, hazelnut, canola, kale, bok choy, rutabaga, frankincense, myrrh, elemi, hemp, pumpkin, squash, curcurbit, manioc, *dalbergia*, legume plants (e.g., alfalfa, lentils, beans, clovers, peas, fava coceira, frijole bola roja, frijole negro, *lespedeza*, licorice, lupin, mesquite, carob, soybean, peanut, tamarind, *wisteria, cassia*, chickpea, garbanzo, fenugreek, green pea, yellow pea, snow pea, yellow pea, lima bean, fava bean), geranium, flax, pomegranate, cotton, okra, neem, fig, mulberry, clove, *eucalyptus*, tea tree, niaouli, fruiting plants (e.g, apple, apricot, peach, plum, pear, nectarine), strawberry, blackberry, raspberry, cherry, prune, rose, tangerine, citrus (e.g., grapefruit, lemon, lime, orange, bitter orange, mandarin), mango, citrus bergamot, buchu, grape, broccoli, brussels, sprout, camelina, cauliflower, rape, rapeseed (canola), turnip, cabbage, cucumber, watermelon, honeydew melon, zucchini, birch, walnut, cassava, baobab, allspice, almond, breadfruit, sandalwood, macadamia, taro, tuberose, aloe vera, garlic, onion, shallot, vanilla, *yucca*, vetiver, galangal, barley, corn, *curcuma aromatica*, galangal, ginger, lemon grass, oat, palm, pineapple, rice, rye, sorghum, triticale, turmeric, yam, bamboo, barley, cajuput, *canna*, cardamom, maize, oat, wheat, cinnamon, *sassafras, lindera benzoin*, bay laurel, avocado, ylang-ylang, mace, nutmeg, moringa, horsetail, oregano, cilantro, chervil, chive, aggregate fruits, grain plants, herbal plants, leafy vegetables, non-grain legume plants, nut plants, succulent plants, land plants, water plants, delbergia, millets, drupes, schizocarps, flowering plants, non-flowering plants, cultured plants, wild plants, trees, shrubs, flowers, grasses, herbaceous plants, brushes, lianas, cacti, green algae, tropical plants, subtropical plants, temperate plants, and derivatives and crosses thereof.

Examples of suitable algae include but are not limited to viridiplantae, stramenopiles, rhodophyta, chlorophyta, PX, flordeophyceae, bangiophyceae, florideohpyceae, trebouxiophyceae, phaeophyceae, *palmariales, gigartinales, bangiales, gigartinales, Chlorella, Laminaria japonica, Laminaria saccharina, Laminaria digitata, Macrocystis pyrifera, Alaria marginata, Ascophyllum nodosum, Ecklonia sp., Palmaria palmata, Gloiopeltis furcata, Porphyra columbina, Gigartina skottsbergii, Gracilaria lichenoides, Chondrus crispus, Gigartina bursapastoris*, and derivatives and crosses thereof.

Examples of suitable fungi include but are not limited to *Candida etchellsii, Candida guilliermondii, Candida humilis, Candida utilis, Candida versatilis, Debaryomyces hansenii, Kluyveromyces lactis, Kluyveromyces marxianus, Kluyveromyces thermotolerans, Pichia pastoris, Rhodotorula sp., Saccharomyces bayanus, Saccharomyces beticus, Saccharomyces cerevisiae, Saccharomyces chevalieri, Saccharomyces diastaticus, Saccharomyces ellipsoideus, Saccharomyces exiguus, Saccharomyces florentinus, Saccharomyces pastorianus, Saccharomyces pombe, Saccharomyces sake, Saccharomyces uvarum, Sporidiobolus johnsonii, Sporidiobolus salmonicolor, Sporobolomyces roseus, Xanthophyllomyces dendrorhous, Yarrowia lipolytica, Zygosaccharomyces rouxii*, and derivatives and crosses thereof.

Examples of suitable microbes include but are not limited to firmicutes, cyanobacteria (blue-green algae), *bacilli, oscillatoriophcideae, bacillales, lactobacillales, oscillatoriales, bacillaceae, lactobacillaceae, arthrospira, Bacillus coagulans, Lactobacillus acidophilus, Lactobacillus Reuteri, Spirulina, Arthrospira platensis, Arthrospira maxima*, and derivatives and crosses thereof.

Natural sources may be obtained from a variety of sources including but not limited to nature (e.g., lakes, oceans, soils, rocks, gardens, forests, plants, animals), brewery stores, and commercial cell banks (e.g., ATCC, collaborative sources).

Modified natural sources may be obtained from a variety of sources including but not limited to brewery stores and commercial cell banks (e.g., ATCC, collaborative sources), or can be generated from natural sources by methods known in the art, including selection, mutation, or gene manipulation. Selection generally involves continuous multiplication and steady increase in dilution rates under selective pressure. Mutation generally involves selection after exposure to mutagenic agents. Gene manipulation generally involves genetic engineering (e.g., gene splicing, insertion of deletions or modifications by homologous recombination) of target genes. A modified natural source may produce a non-native protein, carbohydrate, lipid, or other compound, or produce a non-native amount of a native protein, carbohydrate, lipid, or other compound. In some embodiments, the modified natural source expresses higher or lower levels of a native protein or metabolic pathway compound. In other such embodiments, the modified natural source expresses one or more novel recombinant proteins, RNAs, or metabolic pathway components derived from another plant, algae, microbe, or fungus. In other embodiments, the modified natural source has an increased nutraceutical content compared to its native state. In yet other embodiments, the modified natural source has more favorable growth and production characteristics compared to its native state. In some such embodiments, the modified natural source has an increased specific growth rate compared to its native state. In other such embodiments, the modified natural source can utilize a different carbon source than its native state.

Packaging and Labeling

The nutrient-dense meat structured protein products provided herein may be packaged to keep the nutrient-dense meat structured protein products clean, fresh, contained, or safe; to facilitate inventory control, handling, distribution, stacking, display, sale, opening, reclosing, use, or reuse; or to enable portion control. Suitable packing includes but is not limited to trays, trays with overwrap, bags, cups, films, jars, tubs, bottles, pads, bowls, platters, boxes, cans, cartons, pallets, wrappers, containers, bags-in-boxes, tubes, capsules, vacuum packaging, pouches, and the like, and combinations thereof. The packaging can be made of plastic, paper, metal, glass, paperboard, polyproylene, PET, styrofoam, aluminum, or combinations thereof.

The packaging may carry one or more labels that communicate information to the consumer or that support the marketing of the nutrient-dense meat structured protein product. In some embodiments, the packaging carries a label required by governmental regulation. In some such embodiments, the label is required by regulation of the U.S. Food and Drug Administration (FDA) or the U.S. Department of Agriculture. In other such embodiments, the label is required by regulation of the European Food Safety Authority. In some embodiments, the governmental regulation is Title 21 of the FDA section of the code of federal regulations. In some embodiments, the label indicates that the enclosed nutrient-dense meat structured protein product is free of genetically modified organisms. In some embodiments, the label indicates that the enclosed nutrient-dense meat structured protein product is free of gluten. In some embodiments, the label indicates that the enclosed nutrient-dense meat structured protein product is Kosher. In some embodiments, the label indicates that the enclosed nutrient-dense meat structured protein product is free of cholesterol. In some embodiments, the label indicates that the enclosed nutrient-dense meat structured protein product is vegan. In some embodiments, the label indicates that the enclosed nutrient-dense meat structured protein product is free of an allergen. In some embodiments, the label indicates that the enclosed nutrient-dense meat structured protein product is free of soy. In some embodiments, the label indicates that the enclosed nutrient-dense meat structured protein product is free of nuts.

Nutrient-Dense Condiment

In some embodiments, the nutrient-dense meat structured protein products provided herein are packaged with nutrient-dense condiments.

In some embodiments, the nutrient-dense condiments comprise iron. In some such embodiments, the nutrient-dense condiments comprise at least about 0.2 mg, at least about 0.4 mg, at least about 0.6 mg, at least about 0.8 mg, or at least about 1 mg of iron per ounce. In some embodiments, the nutrient-dense condiments comprise iron at a level of between about 1 mg and about 30 mg, between about 1.5 mg and about 20 mg, between about 1.8 mg and about 18 mg, between about 1 mg and about 6 mg, between about 2 mg and about 5 mg, or between about 3 mg and about 4 mg per 9 g. In some embodiments, the nutrient-dense condiments comprise iron at a level of between about 10% and about 100% of the FDA recommended daily intake value for iron. Iron content of a food product can be determined by a variety of methods, including but not limited to AOAC International reference method AOAC 965.17/985.01mod.

In some embodiments, the nutrient-dense condiments comprise calcium. In some such embodiments, the nutrient-dense condiments comprise at least about 10 mg, at least about 20 mg, at least about 30 mg, at least about 40 mg, or at least about 50 mg of calcium per ounce. In some embodiments, the nutrient-dense condiments comprise calcium at a level of between about 40 mg and about 2 g, between about 40 mg and about 440 mg, between about 100 mg and about 1 g, between about 150 mg and about 800 mg, between about 200 mg and about 600 mg, between about 300 mg and about 500 mg, between about 1 g and about 2 g, or between about 500 mg and about 1 g per 9 g. In some embodiments, the nutrient-dense condiments comprise calcium at a level of between about 10% and about 100% of the FDA recommended daily intake value for calcium. Calcium content of a food product can be determined by a variety of methods, including but not limited to AOAC International reference method AOAC 965.17/985.01 mod.

In some embodiment, the nutrient-dense condiments comprise heat-sensitive nutrients that if present in the nutrient-dense meat structured protein products could be destroyed during cooking. Examples of heat-sensitive nutrients include but are not limited to omega-3 fatty acids, certain antioxidants, certain probiotics, and digestive enzymes.

In some embodiments, the nutrient-dense condiments comprise omega-3 fatty acids. In some such embodiments, the nutrient-dense condiments comprise at least about 0.1 g, at least about 0.2 g, at least about 0.3 g, at least about 0.4 g, or at least about 0.5 g of omega-3 fatty acids per ounce. In some embodiments, the nutrient-dense condiments comprise omega-3 fatty acids at a level of between about 25 mg and about 2 g, between about 50 mg and about 1 g, between about 50 mg and about 500 mg, between about 100 mg and about 400 mg, between about 200 mg and about 300 mg, between about 0.8 g and about 2 g, between about 1 g and about 2 g, or between about 500 mg and about 1 g per 9 g. In some embodiments, the nutrient-dense condiments comprise omega-3 fatty acids at a level of between about 10% and about 100% of the FDA recommended daily intake value for omega-3 fatty acids. Omega-3 fatty acid content of a food product can be determined by a variety of methods, including but not limited to AOAC International reference method AOAC Ce 1b-89.

In some embodiments, the nutrient-dense condiments comprise omega-3 fatty acid eicosapentaenoic acid (EPA). In some such embodiments, the nutrient-dense condiments comprise at least about 0.1 g, at least about 0.2 g, at least about 0.3 g, at least about 0.4 g, or at least about 0.5 g of EPA per ounce. In some embodiments, the nutrient-dense condiments comprise EPA at a level of between about 0.0125 g and about 1 g, between about 0.025 g and about 0.5 g, between about 0.025 g and about 0.25 g, between about 0.05 g and about 0.2 g, between about 0.1 g and about 0.15 g, between about 0.5 g and about 1 g, or between about 0.25 g and about 0.5 g per 9 g. In some embodiments, the nutrient-dense condiments comprise EPA at a level of between about 10% and about 100% of the FDA recommended daily intake value for EPA.

In some embodiments, the nutrient-dense condiments comprise omega-3 fatty acid docosahexaenoic acid (DHA). In some such embodiments, the nutrient-dense condiments comprise at least about 0.01 g, at least about 0.05 g, at least about 0.1 g, at least about 0.2 g, at least about 0.3 g, at least about 0.4 g, or at least about 0.5 g of DHA per ounce. In some embodiments, the nutrient-dense condiments comprise DHA at a level of between about 0.0125 g and about 1 g, between about 0.025 g and about 0.5 g, between about 0.025 g and about 0.25 g, between about 0.05 g and about 0.2 g, between about 0.1 g and about 0.15 g, between about 0.5 g and about 1 g, or between about 0.25 g and about 0.5 g per 9 g. In some embodiments, the nutrient-dense condiments comprise DHA at a level of between about 10% and about 100% of the FDA recommended daily intake value for DHA.

In one embodiment, the nutrient-dense condiments comprise antioxidants. In some embodiments, the nutrient-dense condiments comprise antioxidants at a level of at least about 1,841 ORAC per ounce. In some embodiments, the nutrient-dense condiments comprise at least about 1 mg, at least about 2 mg, at least about 3 mg, at least about 5 mg, at least about 10 mg, or at least about 15 mg of vitamin C per ounce. In some embodiments, the nutrient-dense meat structure protein products comprise between about 1 mg and about 100 mg, between about 6 mg and about 60 mg, or between about 20 mg and about 40 mg of vitamin C per 9 g. In some embodiments, the nutrient-dense condiments comprise at least about 100 IU, at least about 150 IU, at least about 300 IU, at least about 500 IU, at least about 1000 IU, or at least about 1250 IU of vitamin A per ounce. In some embodiments, the nutrient-dense condiments comprise between about 100 IU and about 10,000 IU, between about 500 IU and about 5,000 IU, or between about 1,000 IU and about 3,000 IU of vitamin A per 9 g. In some embodiments, the nutrient-dense condiments comprise at least about 0.75 IU, at least about 1.5 IU, at least about 3 IU, or at least about 7.5 IU of vitamin E per ounce. In some embodiments, the condiments comprise between about 1 IU and about 50 IU, between about 3 IU and about 30 IU, or between about 10 IU and about 20 IU of vitamin E per 9 g. In some embodiments, the nutrient-dense condiments comprise at least about 1 ug, at least about 1.75 ug, at least about 3 ug, at least about 5 ug, at least about 10 ug, or at least about 15 ug of selenium per ounce. In some embodiments, the nutrient-dense condiments comprise between about 1 ug and about 100 ug, between about 7 ug and about 70 ug, or between about 25 ug and about 50 ug of selenium per 9 g. In some embodiments, the nutrient-dense condiments comprise one or more antioxidants at a level of between about 10% and about 100% of the FDA recommended daily intake value for the one or more antioxidants. The water soluble vitamins content of a food item can be determined by a variety of methods, including by JOFCA#18 9751-758) Modified. The beta-carotene content of a food item can be determined by a variety of methods, including by HPLC analysis (see Weissenberg et al., 1997, Chromatographia 46 (7/8):399-403).

In one embodiment, the nutrient-dense condiments provided herein comprise vitamin B-12. In some embodiments, the nutrient-dense condiments comprise at least about 0.3 ug, at least about 0.5 ug, at least about 0.7 ug, at least about 0.9 ug, or at least about 1.1 ug of vitamin B-12 per ounce. In some embodiments, the nutrient-dense condiments comprise vitamin B-12 at a level of between about 0.4 ug and about 7.5 ug, between about 0.6 ug and about 6 ug, between about 0.8 ug and about 7.2 ug, between about 1.6 ug and about 5.6 ug, between about 2.4 ug and about 4.8 ug, between about 2.4 ug and about 4.8 ug, or between about 3.2 ug and about 4 ug per 9 g. In some embodiments, the nutrient-dense condiments comprise vitamin B-12 at a level of between about 10% and about 100% of the FDA recommended daily intake value for vitamin B-12. The vitamin B content of a food item can be determined by a variety of methods, including by reversed-phase liquid chromatography (see Vinas et al., 2003, Journal of Chromatography A 1007: 77-84). The vitamin B-12 content of a food product can be determined by a variety of methods, including but not limited to AOAC International reference method AOAC 952.20/45.2.02.

In some embodiments, the nutrient-dense condiments comprise an agent that enhances the absorption of a nutrient present in the nutrient-dense meat structured protein product. Examples of such agents include but are not limited to ascorbic acid (vitamin C), which has been shown to enhance the absorption of dietary iron. In some embodiments, the nutrient-dense meat structure protein products comprise between about 1 mg and about 100 mg, between about 6 mg and about 60 mg, or between about 20 mg and about 40 mg of vitamin C per 9 g.

The nutrient-dense condiments may optionally include ingredients such as, for example, sugars, starches, oligosaccharides, dietary fibers, fats, flavoring agents (natural or artificial), spices, flavor enhancers, herbs, thickening or gelling agents, gums, cross-linking agents, vitamins, minerals, probiotics, digestive enzymes, and antimicrobial agents.

The nutrient-dense condiments provided herein can be prepared by any procedure commonly used for making condiments. In some embodiments, the procedure for preparing nutrient-dense condiments involves blending dry seasonings together with one or more nutrient selected from the group consisting of iron, omega-3 fatty acids, calcium, antioxidants, and vitamin B-12. In other embodiments, the procedure for preparing nutrient-dense condiments involves adding to an oil and vinegar emulsion, an oil, or vinegar seasonings, aromatics, and one or more nutrient selected from the group consisting of iron, omega-3 fatty acids, calcium, antioxidants, and vitamin B-12. In yet other embodiments, the procedure for preparing nutrient-dense condiments involves adding to pickled vegetables one or more nutrient selected from the group consisting of iron, omega-3 fatty acids, calcium, antioxidants, and vitamin B-12. In yet other embodiments, the procedure for preparing nutrient-dense condiments involves adding to fermented beans, grains, or vegetables one or more nutrient selected from the group consisting of iron, omega-3 fatty acids, calcium, antioxidants, and vitamin B-12.

Marketing and Sale

The nutrient-dense meat structured protein products provided herein can be sold in any suitable venue. Such venues include but are not limited to internet, grocery stores, supermarkets, discounters, mass marketers (e.g., Target, Wal-Mart), membership warehouses (e.g., Costco, Sam's Club), military outlets, drug stores, restaurants, fast food restaurants, delis, markets, butcher shops, health food stores, organic food stores, private caterers, commercial caterers, food trucks, restaurant chains, kiosks, street carts, street vendors, cafeterias (e.g., school cafeterias, hospital cafeterias), and the like.

All references, including publications, patent applications, and patents, cited herein are hereby incorporated by reference to the same extent as if each reference were individually and specifically indicated to be incorporated by reference and/or were set forth in its entirety herein.

EXAMPLES

The following examples are included to demonstrate preferred embodiments of the invention. It should be appreciated by those of skill in the art that the techniques disclosed in the examples that follow represent techniques discovered by the inventors to function well in the practice of the invention. However, those of skill in the art should, in light of the present disclosure, appreciate that many changes can be made in the specific embodiments that are disclosed and still obtain a like or similar result without departing from the spirit and scope of the invention, therefore all matter set forth or shown in the accompanying drawings is to be interpreted as illustrative and not in a limiting sense.

Example 1

Production of a Nutrient-Dense Meat Structured Protein Product by Thermoplastic Extrusion of Pea Protein Protein fibrous products "80% crumbles" and "20% crumbles" were produced by first blending the dry ingredients listed in Table 1 into a dry mix. For each product, the dry ingredient blend was transferred to the hopper of a gravimetric feeder that metered the blend through the feed port of a twin screw extruder (MPF 50/25 Co-rotating Twin-Screw Extruder (APV Baker, Grand Rapids, Mich.)) at a rate of 45.7 kg/h. At the same time, a liquid mix of composition 92% water, 5% potassium bicarbonate, and 3% sorbitol was channeled from a water tank through an in-line water heater that kept the water temperature fixed at 70° F. (21.1° C.), and was pumped via a gear pump through the liquid feed port of the twin screw extruder (located 100 mm downstream of the dry mix feed port) at a rate of 30 kg/h. The twin screw extruder mixed the dry and liquid mixes into a dough that was then extruded.

TABLE 1

Dry Mix Composition (% by weight)

|  | 20% Crumbles | 80% Crumbles |
| --- | --- | --- |
| Pea Protein Isolate | 89.5 | 91.86 |
| Gypsum | 1.84 | 1.89 |
| Cysteine | 0.4 | 0.4 |
| Potassium Bicarbonate | 3.25 | 3.34 |
| Other ingredients (e.g., flavoring) | 5.01 | 2.51 |

Pea protein isolate (F85M) was obtained from Roquette, Inc., Lestrem, France, having a composition of 80% protein, 6% fat, 3% carbohydrate, 1% dietary fiber, 4% ash, and 7% water.
Gypsum (Calcium Sulfate, Dihydrate, Terra Alba) was obtained from CGC, Inc. Chicago, IL, having a composition of 80.0% ash (23,000 mg calcium/100 g) and 20.0% water.
Cysteine was obtained from Prinova, Inc., Carol Stream, IL, and is a semi-essential amino acid.
Potassium bicarbonate was obtained from Flow K; Church & Dwight Co., Inc. (Ewing, NJ), having a composition of 69.0% ash (39,060 mg potassium/100 g) and 31% water.

Extrusion parameters are shown in Table 2.

TABLE 2

Extrusion Parameters

| Screw Profile Assembly | Zones 1-3: conveying screw elements; Zones 4, 5: mixing screw elements; Zones 6-9: medium shear screws; Zone 10: final mixing screws. |
| --- | --- |
| Extruder Barrel | 10 zones, each individually controlled via an electric heater cartridge (4 × 900 W per zone) and a cooling water jacket (supplied with building water, 60° F.); overall barrel length = 1,250 mm; length of each zone = 125 mm |
| Barrel Heater Set Points | Zones 1-4: 30-35° C.; Zones 5-7: 52-96° C.; Zones 8-10: 116-130° C. |
| Extrusion Screws | Co-rotating in counter-clockwise direction at 300 revolutions per minute. |

The nutrient-dense protein fibrous products emerged from the extruder as short, somewhat irregular, strands of crumbles. The composition of the crumbles was about 45% by weight of protein, about 2.8% by weight of carbohydrate (about 0.6% by weight of edible fiber), about 3.3% by weight of lipid, about 0.9% by weight of calcium, and about 42% by weight of water.

The protein fibrous products were allowed to cool on a pan for 5 minutes, before they were post-processed (hydrated/marinated) in the kettle mixtures shown in Table 3. The kettle mixtures were boiled and maintained at a slight boil until most moisture had been removed (about 15 to 25 minutes held at 185-212° F.), before the remaining oil/water was decanted out.

TABLE 3

Kettle Mixtures (% by weight)

|  | 20% Crumbles | 80% Crumbles |
| --- | --- | --- |
| Protein Fibrous Product | 48.3 | 54.18 |
| Water | 38.94 | 26.73 |
| Flaxseed Oil | 0 | 8.11 |
| DHA Oil | 0 | 0.24 |
| Other ingredients (e.g.. lipid) | 12.76 | 10.74 |

Flax seed oil was obtained from Murphy Commodities, Portland, OR, and comprises omega-3 fatty acids.
DHA oil was obtained from Skidmore Sales & Distributing Company, and comprises omega-3 fatty acids.

The hydrated/marinated protein fibrous products were combined into a meat-like food product burger mix according to the recipe shown in Table 4.

TABLE 4

Burger Comosition (% by weight)

| 20% Crumbles | 12.25 |
| --- | --- |
| 80% Crumbles | 48.99 |
| Pea Protein Isolate | 1.34 |
| GrandFusion#3 Blend | 0.1 |
| Ferric Orthophosphate | 0.01 |
| cyanocobalamin | 0.0017 |
| Water | 27.96 |
| other ingredients (e.g., flavoring, binding, lipids, coloring) | 9.35 |

GrandFusion#3 Blend was obtained from NutriFusion, Hilton Head SC, and comprises antioxidants.
Ferric Orthophosphate was obtained from Wright Group, Crowley, LA, and comprises iron.
Cyanocobalamin was obtained from Prinova, Inc., Carol Stream, IL, and comprises vitamin B-12.

The burger mix was portioned and formed into 113 g patties. The patties were placed on a lightly oiled pan, covered, and baked in a 325° F. convection oven for 13 minutes, flipped over and baked for an additional 5 minutes. The final burger had the nutrient composition shown in Table 5.

TABLE 5

Burger Nutrient Composition (per 113 g)

| | |
|---|---|
| Protein | 23.19 g |
| Calcium | 147.2 mg |
| Iron | 2.71 mg |
| Vitamin B12 | 1.5 ug |
| Omega-3 Fatty Acid ALA | 2.18 g |
| Omega-3 Fatty Acid DHA | 0.06 g |
| Antioxidant Vitamin A | 1,000 IU |
| Antioxidant Vitamin C | 12 mg |

Example 2

Preparation of a Nutrient-Dense Condiment

This example described the preparation of a condiment comprising vitamin C and antioxidants.

The composition of the condiment is shown in Table 6.

TABLE 6

Condiment Composition (% by weight)

| | |
|---|---|
| Soy-free Vegan Mayonnaise (Follow Your Hearth Vegenaise) | 71.1 |
| Ketchup | 17.1 |
| Pickles, chopped fine | 7.6 |
| Wasabi | 0.1 |
| Sea Salt | 0.5 |
| Black Pepper | 0.1 |
| Stevia | 1.6 |
| Ascorbic Acid (vitamin C) | 1.3 |
| Camu Camu | 0.6 |

The condiment was prepared by mixing together ketchup, pickles, wasabi, salt, pepper, stevia, ascorbic acid, and camu camu until homogenous. The Vegan Mayonnaise was then added and blended to homogeneity.

The condiment may optionally comprise additional antioxidants, probiotics, and digestive enzymes. Instead of commercially available ketchup, a sugar-free ketchup may be used. Likewise, a substitute mayonnaise may be used. When non-commercial ketchup and mayonnaise are used, these ingredients can also be supplemented with vitamin C and/or antioxidants, or with other essential nutrients.

Example 3

Analysis of Protein Fiber Structure

Samples are fixed for 8-24 hours, then successively placed in a sucrose gradient (10% sucrose for 1 hour, 20% sucrose for 1 hour, and 30% sucrose overnight), before being placed in OCT and frozen in isopentane. The OCT blocks are sliced on a microtome along either longitudinal or transversal axes, the slices are transferred to cold glass slides, and the sections are stained with PAS (Periodic Acid-Schiff) to identify polysaccharides and glycolipids, or with H&E (Hematoxylin & Eosin) to identify protein. The slices are imaged with a Nikon Eclipse E600 upright microscope with phase contrast, epifluorescence, and bright field capabilities (Nikon Corp., Japan) at 20× and 200× magnification to determine the presence of protein fiber networks similar to those present in animal meat. Interspersed open spaces are filled with polysaccharides and glycolipids.

Example 4

Determining Moisture Content of a Meat Structured Protein Product

An approximately 2 g sample of a meat structured protein product is blended in a blender for 30 seconds. The sample is weighed in a dried aluminum pan, heated in an oven for 16 hours at 103° C., and reweighed after heating. MC is calculated by dividing the mass of the moisture lost during heating by the total mass of the product prior to heating. Average MC is calculated from 3 or more independent samples.

What is claimed is:

1. A process for producing a nutrient-dense meat structured protein product comprising protein fibers that are substantially aligned, wherein the process comprises:
    a) combining a non-animal protein material and water with at least one heat stable nutrient to form a dough;
    b) shearing and heating the dough so as to denature the proteins in the protein material and produce protein fibers that are substantially aligned in a fibrous structure;
    c) setting the dough to fix the fibrous structure previously obtained, thereby obtaining a nutrient-dense meat structured protein product having a moisture content of at least 30% by weight and comprising at least 5% by weight of a non-animal protein material and at least 0.25 mg of heat stable nutrient per ounce of the nutrient-dense meat structured protein product; and
    d) as a post-processing step, adding at least one non-heat stable nutrient to the nutrient-dense meat structured protein product.

2. A process of claim 1 wherein the at least one non-heat stable nutrient comprises at least about 0.4 g of omega-3 fatty acids per ounce of nutrient-dense meat structured protein product, at least about 1,841 ORAC of antioxidants per ounce of nutrient-dense meat structured protein product, and at least about 0.7 ug of vitamin B-12 per ounce of nutrient-dense meat structured protein product, and wherein the at least one heat stable nutrient comprises at least about 30 mg of calcium per ounce of nutrient-dense meat structured protein product.

3. A process of claim 1 wherein the heat stable nutrient is iron.

4. A process of claim 3 wherein the nutrient-dense meat structure protein product contains at least about 0.2 mg of iron per ounce of nutrient-dense meat structured protein product.

5. A process of claim 3 wherein the nutrient-dense meat structured protein product contains between about 0.5 mg and about 1.25 mg of iron per ounce of nutrient-dense meat structured protein product.

6. A process of claim 1 wherein the heat stable nutrient is calcium.

7. A process of claim 6 wherein the nutrient-dense meat structured protein product contains between about 10 mg and about 110 mg of calcium per ounce of nutrient-dense meat structured protein product.

8. A process of claim 1 wherein the non-heat stable nutrient is an omega-3 fatty acid.

9. A process of claim 8 wherein the nutrient-dense meat structured protein product contains at least about 0.1 g of omega-3 fatty acids per ounce of nutrient-dense meat structured protein product.

10. A process of claim 8 wherein at least a portion of the omega-3 fatty acid is the omega-3 fatty acid eicosapentaenoic acid (EPA).

11. A process of claim 8 wherein at least a portion of the omega-3 fatty acid is the omega-3 fatty acid docosahexaenoic acid (DHA).

12. A process of claim 8 wherein the nutrient-dense meat structured protein product contains between about 0.2 g and about 0.5 g of omega-3 fatty acid per ounce of nutrient-dense meat structured protein product.

13. A process of claim 1 wherein the non-heat stable nutrient is an antioxidant.

14. A process of claim 13 wherein the nutrient-dense meat structured protein product contains at least 1,841 ORAC of antioxidant per ounce of nutrient-dense meat structured protein product.

15. A process of claim 1 wherein the non-heat stable nutrient is vitamin B-12.

16. A process of claim 15 wherein the nutrient-dense meat structured protein product contains at least about 0.3 ug of vitamin B-12 per ounce of nutrient-dense meat structured protein product.

17. A process of claim 15 wherein the nutrient-dense meat structured protein product contains at least about 0.3 ug of vitamin B-12 per ounce of nutrient-dense meat structured protein product.

18. A process of claim 15 wherein the nutrient-dense meat structured protein product contains between about 0.5 ug and about 1.1 ug of vitamin B-12 per ounce of nutrient-dense meat structured protein product.

19. A process of claim 1 wherein the nutrient-dense meat structured protein product of has an alkaline pH of between 7.4 and about 10.0.

20. A process for producing a nutrient-dense meat structured protein product comprising protein fibers that are substantially aligned, wherein the process comprises:
    a) combining a non-animal protein material and water to form a dough;
    b) shearing and heating the dough so as to denature the proteins in the protein material and produce protein fibers that are substantially aligned in a fibrous structure;
    c) setting the dough to fix the fibrous structure previously obtained, thereby obtaining a protein fibrous product; and
    d) subjecting such protein fibrous product to at least one post-processing step wherein at least one non-heat stable nutrient is added to the protein fibrous product during such post-processing step so as to obtain a nutrient-dense meat structured protein product having a moisture content of at least 30% by weight and comprising at least 5% by weight of a non-animal protein material and at least one non-heat stable nutrient.

21. A process of claim 20 wherein the non-heat stable nutrient is an omega-3 fatty acid.

22. A process of claim 21 wherein the nutrient-dense meat structured protein product contains between about 0.2 g and about 0.5 g of omega-3 fatty acid per ounce of nutrient-dense meat structured protein product.

23. A process of claim 20 wherein the non-heat stable nutrient is an antioxidant.

24. A process of claim 23 wherein the nutrient-dense meat structured protein product contains at least 1,841 ORAC of antioxidant per ounce of nutrient-dense meat structured protein product.

25. A process of claim 20 wherein the non-heat stable nutrient is vitamin B-12.

26. A process of claim 25 wherein the nutrient-dense meat structured protein product contains between about 0.5 ug and about 1.1 ug of vitamin B-12 per ounce of nutrient-dense meat structured protein product.

* * * * *